(12) United States Patent
Kiessling et al.

(10) Patent No.: US 9,218,230 B2
(45) Date of Patent: Dec. 22, 2015

(54) METHOD FOR TRANSMITTING MESSAGES IN A REDUNDANTLY OPERABLE INDUSTRIAL COMMUNICATION NETWORK AND COMMUNICATION DEVICE FOR THE REDUNDANTLY OPERABLE INDUSTRIAL COMMUNICATION NETWORK

(71) Applicants: Marcel Kiessling, Cadolzburg (DE); Joachim Lohmeyer, Hilpolstein (DE)

(72) Inventors: Marcel Kiessling, Cadolzburg (DE); Joachim Lohmeyer, Hilpolstein (DE)

(73) Assignee: Siemens Aktiengesellschaft, Munich (DE)

( * ) Notice: Subject to any disclaimer, the term of this patent is extended or adjusted under 35 U.S.C. 154(b) by 323 days.

(21) Appl. No.: 13/954,619

(22) Filed: Jul. 30, 2013

(65) Prior Publication Data

US 2014/0040657 A1  Feb. 6, 2014

(30) Foreign Application Priority Data

Jul. 31, 2012  (EP) .................................. 12178677

(51) Int. Cl.
*G06F 11/07* (2006.01)
*H04L 12/40* (2006.01)

(52) U.S. Cl.
CPC ...... *G06F 11/0709* (2013.01); *H04L 12/40169* (2013.01)

(58) Field of Classification Search
CPC .... G06F 11/0709; H04L 12/42; H04L 12/437

USPC ........................................................ 714/4.1
See application file for complete search history.

(56) References Cited

U.S. PATENT DOCUMENTS

| | | | | |
|---|---|---|---|---|
| 2010/0254309 A1* | 10/2010 | Mankins et al. | ............... | 370/328 |
| 2012/0008530 A1* | 1/2012 | Kulkarni et al. | ............... | 370/256 |
| 2013/0138832 A1* | 5/2013 | Qi et al. | ........................ | 709/238 |

FOREIGN PATENT DOCUMENTS

| | | |
|---|---|---|
| EP | 2 343 857 | 7/2011 |
| WO | WO 2008/119649 | 10/2008 |
| WO | WO 2010/105828 | 9/2010 |

* cited by examiner

*Primary Examiner* — Jigar Patel
(74) *Attorney, Agent, or Firm* — Cozen O'Connor (57) ABSTRACT

A method for transmitting messages in a redundantly operable communication network includes a first subnetwork with a tree topology and a second subnetwork, wherein messages are transmitted in the first subnetwork in accordance with a spanning tree protocol, communication devices associated with network nodes of the first subnetwork interchange messages containing topology information with one another in order to form a tree topology, messages are transmitted in the second subnetwork in accordance with a parallel or ring redundancy protocol, and a virtual network node which is connected to all network nodes of the second subnetwork via a respective virtual connection which is uninterruptable by an error is configured as the root network node of the first subnetwork.

28 Claims, 5 Drawing Sheets

FIG. 6

METHOD FOR TRANSMITTING MESSAGES IN A REDUNDANTLY OPERABLE INDUSTRIAL COMMUNICATION NETWORK AND COMMUNICATION DEVICE FOR THE REDUNDANTLY OPERABLE INDUSTRIAL COMMUNICATION NETWORK

BACKGROUND OF THE INVENTION

An industrial automation system usually comprises a multiplicity of automation devices networked to one another via an industrial communication network and, within the scope of production or process automation, is used to control or regulate installations, machines or devices. On account of time-critical boundary conditions in technical systems automated using industrial automation systems, real-time communication protocols, such as Profinet, Profibus or real-time Ethernet, are predominantly used in industrial communication networks for communication between automation devices.

Interruptions in communication connections between computer units of an industrial automation system or automation devices may result in undesirable or unnecessary repetition of the transmission of a service request. This causes additional utilization of communication connections of the industrial automation system, which may result in further system faults or errors. In addition, untransmitted or incompletely transmitted messages that may prevent an industrial automation system from changing to or remaining in a safe operating state, for example. This may finally result in failure of a complete production installation and may cause costly production downtime. A particular problem regularly results in industrial automation systems from message traffic with a comparatively large number of, but relatively short, messages, thus intensifying the above problems.

WO 2008/119649 A1 discloses a method for reconfiguring a packet-switched communication network comprising a first subnetwork and a second subnetwork. Whereas a first network protocol is used in the first subnetwork, a second network protocol different from the first network protocol is used in the second subnetwork. Both subnetworks are connected to one another by at least three redundant data links, only one of which is respectively activated for the purpose of interchanging useful data. Here, a master data link is activated in a preset manner, while at least two slave data links are deactivated in a preset manner. Failure of the master data link or a slave data link is monitored by a master bridge of the second subnetwork, which master bridge is connected to the master data link. In the event of such failure, the master bridge generates a first data packet and transmits this data packet to a slave bridge of the second subnetwork, which slave bridge is connected to a slave data link. The slave bridge is selected by the master bridge according to a predefinable selection rule. The first data packet is then processed by the selected slave bridge. The first data packet comprises logical information that is used to at least partially execute the first network protocol on a port of the slave bridge connected to the slave data link and to activate the slave data link using the first network protocol executed on the port of the slave bridge.

EP 2 343 857 A1 describes a network node for a communication network comprising a first subnetwork and a second subnetwork connected to the first subnetwork. Whereas a spanning tree protocol is used in the first subnetwork, a second protocol that differs from the protocol of the first subnetwork is used in the second subnetwork. The network node is set up as an element for the second subnetwork and is designed for communication inside the second subnetwork. In addition, the network node is designed and set up as a spanning tree main node for monitoring and controlling the second subnetwork by a spanning tree functionality. The second subnetwork can therefore be treated as a virtual network node by the spanning tree protocol used in the first subnetwork by virtue of the network node, as the spanning tree main node, applying a spanning tree protocol for other network nodes of the second subnetwork.

WO 2010/105828 A1 discloses a method for operating a communication network that has redundancy properties and has a ring network topology. Inside the communication network, the data ports of communication devices are connected to one another via data lines and the communication devices interchange control data and useful data via the data lines based on communication protocols. In order to avoid endless circulation of messages in meshes of the communication network, the communication protocols are used to prevent transmission of messages via selected data ports of individual communication devices, with the exception of messages for controlling or monitoring media redundancy. Two different communication protocols are used in a parallel manner in the communication devices inside the communication network. Parallel use of the different communication protocols is achieved, for example, by allocating control of data ports to be blocked to an individual communication protocol. Alternatively, parameters may be selected for the communication protocols such that a first communication protocol does not block any connections that are considered to be active in accordance with a second communication protocol.

SUMMARY OF THE INVENTION

It is an object of the present invention to provide a method for transmitting messages in a redundantly operable industrial communication network including at least two subnetworks, which method makes it possible, when a spanning tree protocol is used in one of the subnetworks, to rapidly reconfigure the network in the event of an error, and to provide a communication device suitable for implementing the method.

This and other objects and advantageous are achieved in accordance with the invention by providing a method and communication device in which messages are transmitted in a first subnetwork with a tree topology in accordance with a spanning tree protocol. Here, communication devices associated with network nodes of the first subnetwork interchange messages containing topology information with one another to form a tree topology. A root network node is determined as the basic element of a tree topology by the communication devices associated with the network nodes of the first subnetwork based on the interchanged topology information. Loop-free connections are set up from the root network node to the remaining network nodes of the first subnetwork. Messages are transmitted in a second subnetwork in accordance with a parallel or ring redundancy protocol. The first and second subnetworks are coupled to one another via a plurality of communication devices. The communication devices associated with the network nodes of the first and second subnetworks are preferably switches or bridges.

According to the invention, a virtual network node, which is connected to all network nodes of the second subnetwork via a respective virtual connection which cannot be interrupted by an error, is configured as the root network node of the first subnetwork. In addition, topology information for the first subnetwork, which comprises the virtual network node, is configured as received topology information for the first subnetwork at a respective virtual terminal connection of communication devices associated with the network nodes of the second subnetwork. The virtual network node and the virtual connections and terminal connections make it possible to specify imaginary entities, or entities concretized using their properties which, although not physically present, have effects in terms of their describable functionality. The virtual network node and the virtual connections and terminal connections may be simulated via software, for example, with the result that their effects may be represented.

Failure of a communication device associated with a network node of the second subnetwork or of a connection between two network nodes of the second subnetwork is handled, according to the invention, solely in accordance with the parallel or ring redundancy protocol. A configuration of the virtual network node as the root network node of the first subnetwork is retained in this case. With the method according to the invention, the first subnetwork can treat the second subnetwork as a star-shaped expansion starting from the root network node, with the result that topological changes in the second subnetwork, in principle, do not affect the configuration and operation of the first subnetwork. In particular, errors or faults in the second subnetwork can be handled quickly based on the parallel or ring redundancy protocol used there. Associated reconfiguration of the second subnetwork does not substantially affect the first subnetwork.

According to one preferred embodiment of the method according to the invention, the virtual network node is configured by activating a respective virtual terminal connection on at least two communication devices associated with network nodes of the second subnetwork. When configuring the virtual network node, topology information for the first subnetwork is first of all advantageously checked, in each case using a node identifier associated with a root network node, in order to determine whether a virtual network node identified by its node identifier is already present inside the first subnetwork. Here, a virtual terminal connection on a first communication device associated with a first network node of the second subnetwork is activated only in the case of a negative check result. Here, disappearing path costs are associated with a virtual connection between the first network node and the virtual network node. Overall, this makes it possible to prevent more than one root network node from being produced in the first subnetwork as a result of a virtual network node being configured. This would otherwise result in the tree topology of the first subnetwork being divided in an undesirable manner.

According to another embodiment of the method according to the invention, in the case of a positive check result, path costs between a first network node of the second subnetwork, which is associated with the first communication device, and the virtual network node are determined. Here, a virtual terminal connection on a second communication device associated with a second network node of the second subnetwork is activated only in the case of disappearing path costs between the first network node and the virtual network node. Here, disappearing path costs are associated with a virtual connection between the second network node and the virtual network node. An incorrect configuration can be signaled, for example, in the case of non-disappearing path costs between the first network node and the virtual network node, thus making it possible to initiate rapid rectification of an incorrect configuration.

According to an alternative embodiment of the method according to the invention, when configuring the virtual network node, a check can be carried out to determine whether all communication devices linked to the virtual network node are connected to one another inside the second subnetwork. An incorrect configuration is signaled if this is not the case in accordance with a negative check result. This also makes it possible to prevent the configuration of the virtual network node from resulting in division of the communication network.

Communication devices associated with network nodes of the second subnetwork preferably interchange messages containing topology information for the first subnetwork with one another in accordance with the parallel or ring redundancy protocol and compare said messages with locally available topology information for the first subnetwork. The communication devices associated with network nodes of the second subnetwork determine resultant topology information for the first subnetwork on based on a comparison result. In addition, the communication devices associated with the network nodes of the second subnetwork use the determined resultant topology information for the first subnetwork to adapt their configuration with respect to closed and/or open connections to the first subnetwork. According to another embodiment of the method according to the invention, messages are transmitted between communication devices associated with the network nodes of the second subnetwork solely in accordance with the parallel or ring redundancy protocol. Therefore, there is no need to form a tree topology for the second subnetwork using a spanning tree protocol. This decisively contributes to rapidly activating replacement connections following device or connection failures. In addition, the spanning tree protocol and the parallel or ring redundancy protocol are used in the respective subnetwork in a manner substantially decoupled from one another.

According to one preferred embodiment of the method according to the invention, the topology information for the first subnetwork comprises details of existing connections between network nodes of the first subnetwork, and loop-free connections from the root network node to the remaining network nodes of the first subnetwork are set up using a determination of minimum path costs to the root network node. In addition, the resultant topology information for the first subnetwork is consistently determined by all communication devices associated with the network nodes of the second subnetwork in accordance with another embodiment. Therefore, the resultant topology information can be consistently provided for communication devices associated with network nodes of the first subnetwork for use of the spanning tree protocol in the first subnetwork.

The spanning tree protocol may be, for example, the spanning tree protocol according to Institute of Electrical and Electronic Engineers (IEEE) standard 802.1d, the rapid spanning tree protocol according to IEEE standard 802.1D-2004, clause 17 "Rapid Spanning Tree Protocol (RSTP)", or the multiple spanning tree protocol according to IEEE standard 802.1Q-2011, clause 13 "Spanning Tree Protocols". The messages containing topology information for the first subnetwork are, for example, bridge protocol data units (BPDU) or preferably each comprise a port priority vector that is interchanged and compared among communication devices associated with the network nodes of the second subnetwork.

The parallel or ring redundancy protocol is, for example, the parallel redundancy protocol according to Industrial Electrotechnical Commission (IEC) standard 62439-3, clause 4, the high-availability seamless redundancy protocol according to IEC standard 62439-3, clause 5, or the media redundancy protocol according to IEC standard 62439. When the high-availability seamless redundancy protocol is used as the ring redundancy protocol, the communication devices associated with the network nodes of the second subnetwork preferably each comprise at least one first transmitting and receiving unit and one second transmitting and receiving unit each having an interface for a network connection of the second subnetwork. The second subnetwork has a ring topology in this case. Furthermore, both transmitting and receiving units may have an identical network address and an identical device identifier. In addition, a signal processing unit is advantageously connected to each of the first and second transmitting and receiving units, which signal processing unit forwards messages to be transmitted to both transmitting units in a parallel manner and detects redundant messages received by the receiving units. In addition, a coupling element is preferably connected to each of the signal processing units and is used to connect a simply connected network node or a redundancy-free subnetwork to the signal processing unit. According to another embodiment of the method according to the invention, messages which are redundant with respect to one another are identified by a consistent sequence number, sequence numbers of messages which have already been received in an error-free manner being stored in a memory unit associated with the signal processing unit. The signal processing unit, upon receiving a new message, can therefore check its sequence number for a match with a sequence number that has already been stored.

When the media redundancy protocol is used as the ring redundancy protocol according to another advantageous embodiment of the present invention, a communication device in the second subnetwork is configured as a monitoring and control unit. The second subnetwork has a ring topology in this case. The monitoring and control unit detects an interruption inside the ring topology using transmitted test data packets and controls forwarding of data packets containing useful data, which are addressed to a first terminal connection of the communication device configured as a monitoring and control unit, to a second terminal connection of this communication device.

It is also an object of the invention to provide a communication device that is intended and configured for a redundantly operable industrial communication network and that comprises a first subnetwork with a tree topology and message transmission in accordance with a spanning tree protocol, a second subnetwork and message transmission in accordance with a parallel or ring redundancy protocol and a plurality of communication devices that couple both subnetworks. Provided as devices for transmitting messages inside the second subnetwork in accordance with the parallel or ring redundancy protocol are, for example, a first transmitting and receiving unit and a second transmitting and receiving unit, a signal processing unit with a multiplexer unit and a redundancy handling unit and a coupling element which is connected to the signal processing unit. The coupling element is preferably a high-speed bus that can be used to connect, for example, simply connected network nodes or redundancy-free subnetworks to the signal processing unit. In particular, the coupling element may be a backplane switch with an associated controller. Alternatively, the coupling element may also be implemented, in principle, using a matrix combinational circuit. The signal processing unit is preferably implemented using a field programmable gate array (FPGA).

The communication device according to the invention also comprises a device for configuring a root network node of the first subnetwork as a virtual network node which is connected to all network nodes of the second subnetwork via a respective virtual connection which cannot be interrupted by an error. This devices may be implemented, for example, by a controller associated with the coupling element. A device for configuring topology information for the first subnetwork, which comprises the virtual network node, as topology information for the first subnetwork received at a virtual terminal connection are additionally provided. This device may likewise be implemented by a controller associated with the coupling element. According to the invention, the topology information is intended to determine a root network node as the basic element of the tree topology. Here, the root network node forms a starting point for setting up loop-free connections to the remaining network nodes of the first subnetwork. The communication device according to the invention also comprises a device for handling failure of a communication device associated with a network node of the second subnetwork or of a connection between two network nodes of the second subnetwork solely in accordance with the parallel or ring redundancy protocol. A configuration of the virtual network node as the root network node of the first subnetwork is retained in this case. The device for handling failure of a communication device associated with a network node of the second subnetwork or of a connection between two network nodes of the second subnetwork are preferably formed by the redundancy handling unit associated with the signal processing unit. Overall, the communication device according to the invention enables considerably reduced recovery times following device or connection failures.

According to one advantageous embodiment of the communication device according to the invention, the virtual network node is configured by activating a virtual terminal connection on at least two communication devices associated with network nodes of the second subnetwork. Here, the communication device may be set up and configured such that, when configuring the virtual network node, topology information for the first subnetwork is first of all checked, in each case using a node identifier associated with a root network node, in order to determine whether a virtual network node identified by its node identifier is already present inside the first subnetwork. In addition, the communication device may be set up and configured such that a virtual terminal connection on a first communication device associated with a first network node of the second subnetwork is activated only in the case of a negative check result. In this case, disappearing path costs are associated with a virtual connection between the first network node and the virtual network node. Overall, this development of the communication device according to the invention can be used to prevent undesirable division of the tree topology of the first subnetwork.

In addition, the communication device may be set up and configured such that, in the case of a positive check result, path costs between a first network node of the second subnetwork, which is associated with the first communication device, and the virtual network node are determined, and such that a virtual terminal connection on a second communication device associated with a second network node of the second subnetwork is activated only in the case of disappearing path costs between the first network node and the virtual network node. In this case, disappearing path costs are associated with a virtual connection between the second network node and the virtual network node. In addition, the communication device may be set up and configured such that an incorrect configuration is signaled in the case of non-disappearing path costs between the first network node and the virtual network node. This enables deliberate initiation of measures for rapidly rectifying an incorrect configuration. According to an alternative embodiment, the communication device may be configured and set up such that, when configuring the virtual network node, a check is performed to determine whether all communication devices linked to the virtual network node are connected to one another inside the second subnetwork, and such that an incorrect configuration is signaled in the case of a negative check result.

According to one advantageous embodiment, the communication device according to the invention comprises a device for interchanging messages containing topology information for the first subnetwork with further communication devices associated with network nodes of the second subnetwork in accordance with the parallel or ring redundancy protocol. These devices may be implemented, for example, by the first and second transmitting and receiving units, the signal processing unit, the coupling element and a protocol wrapper associated with the signal processing unit. A device for comparing interchanged messages containing topology information for the first subnetwork with locally available topology information for the first subnetwork and for determining resultant topology information for the first subnetwork based on a comparison result is additionally preferably provided. This device may be implemented, for example, by the signal processing unit.

In addition, according to a preferred embodiment, the communication device according to the invention may comprise a device for adapting its configuration with regard to closed and/or open connections to the first subnetwork using the determined resultant topology information for the first subnetwork. This device may be implemented, for example, by a controller of the coupling element. The communication device is preferably set up to transmit messages inside the second subnetwork solely in accordance with the parallel or ring redundancy protocol. Therefore, the spanning tree protocol and the parallel or ring redundancy protocol can be used in the respective subnetwork in a manner substantially decoupled from one another.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE PREFERRED EMBODIMENTS

Figure 1:
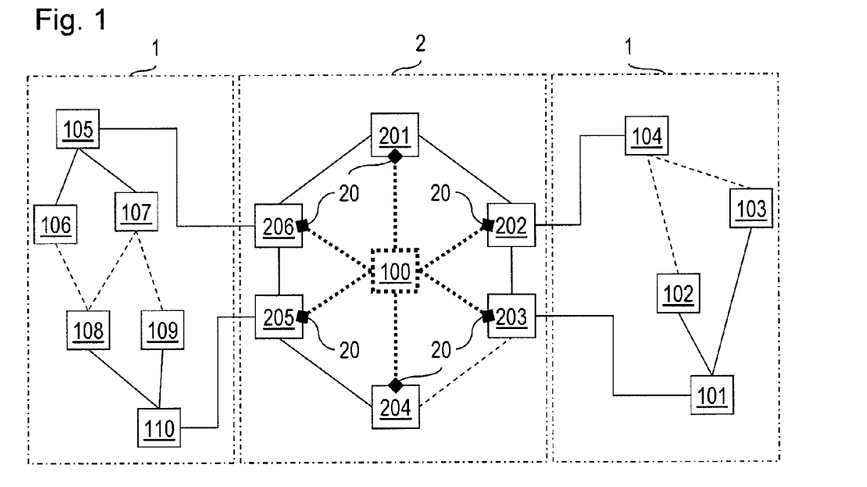
FIG. 1 shows a redundantly operable industrial communication network that comprises a first subnetwork with a tree topology and a second subnetwork with a ring topology, in an error-free connection state.

The industrial communication network illustrated in FIG. 1 comprises a first subnetwork 1 with a tree topology and message transmission in accordance with a spanning tree protocol and a second subnetwork 2 with a ring topology and message transmission in accordance with a ring redundancy protocol. Messages between communication devices 201-206 associated with network nodes of the second subnetwork 2 are transmitted solely in accordance with the ring redundancy protocol. In principle, a parallel redundancy protocol could also be used in the second subnetwork 2 instead of the ring redundancy protocol. The following comments equally apply to this case.

The first subnetwork 1 and the second subnetwork 2 are coupled to one another via a plurality of communication devices 101, 104, 105, 110, 202, 203, 205, 206. All connections between the communication devices 101, 104, 105, 110, 202, 203, 205, 206 are activated in the present exemplary embodiment. Deactivated connections are represented by dashed lines in the figures, while solid lines symbolize activated connections. This applies to both subnetworks 1, 2.

Communication devices 101-110 associated with network nodes of the first subnetwork 1 interchange messages containing topology information with one another to form a tree topology and determine a root network node as the basic element of a tree topology using the interchanged topology information. In the present exemplary embodiment, the spanning tree protocol is the rapid spanning tree protocol. However, the comments below equally apply to the spanning tree protocol, the multiple spanning tree protocol or comparable spanning tree protocols.

According to the invention, a virtual network node that is associated with a virtual root bridge 100, connected to all communication devices 201-206 of the second subnetwork 2 via a respective virtual connection which cannot be interrupted by an error, is configured as the root network node of the first subnetwork 1. This is illustrated in FIG. 1 by dashed bold lines between the virtual root bridge 100 at the virtual root network node of the first subnetwork 1 and the communication devices 201-206 at the network nodes of the second subnetwork 2.

The virtual root network node is configured by activating a respective virtual terminal connection 20 on at least two communication devices 201-206 associated with network nodes of the second subnetwork 2. As bridge ID for use of the spanning tree protocol, the virtual root network node of the first subnetwork 1 is allocated the value 0 in the present exemplary embodiment according to IEEE 802.1D, with the result that it always has the lowest bridge ID of all network nodes 100-110 of the first subnetwork 1 and is therefore permanently predefined as the root network node. The root network node generally has the value with the highest priority as the bridge ID. In the case of the spanning tree protocol according to IEEE 802.1D, the value with the highest priority is represented by the value 0, the network node with the lowest bridge ID having the highest priority for use of the spanning tree protocol.

The messages containing topology information for the first subnetwork 1, which are interchanged between the communication devices 101-110 of the first subnetwork 1, may be bridge protocol data units (BPDU) that are used by the communication devices 101-110 of the first subnetwork 1 to configure their port states. Connections between network nodes, in particular, are activated or deactivated by configuring the port states. The topology information for the first subnetwork 1 comprises, in particular, details of existing connections between network nodes of the first subnetwork 1 and their path costs. This also applies to transit connections through the second subnetwork 2 with a ring topology. The communication devices 101-110 of the first subnetwork set up loop-free connections from the virtual root network node to the remaining network nodes of the first subnetwork 1 in an autonomous/interacting manner based on a determination of minimum path costs to the virtual root network node. Further details of this can be gathered, for example, from IEEE 802.1D-2004, clause 17 "Rapid Spanning Tree Protocol (RSTP)", with respect to the rapid spanning tree protocol.

In the present exemplary embodiment, when configuring the virtual root network node, messages containing topology information for the first subnetwork 1 each initially checked, using a bridge ID of a root network node of the first subnetwork 1 which is stated there, in order to determine whether a virtual root network node identified by its bridge ID is already present inside the first subnetwork 1. A virtual terminal connection 20 on a first communication device 201-206 associated with a first network node of the second subnetwork 2 is activated only in the case of a negative check result. Here, the value 0 is associated with a virtual connection between the first network node and the virtual root network node as path costs.

In the present exemplary embodiment, in the case of a positive check result, i.e., in the case of a virtual root network node which is, in principle, already present, path costs between a first network node of the second subnetwork 2, which is associated with the first communication device 201-206, and the virtual root network node are determined. A virtual terminal connection 20 on a second communication device 201-206 associated with a second network node of the second subnetwork 2 is activated only in the case of path costs with the value 0 between the first network node of the second subnetwork 2 and the virtual root network node. Here, the value 0 is associated with a virtual connection between the second network node and the virtual root network node as path costs. An incorrect configuration is signaled if non-disappearing path costs between the first network node and the virtual root network node are determined.

A virtual terminal connection 20 for the virtual root network node on a third or further communication device 201-206 of the second subnetwork 2 is activated in an analogous manner to the activation of the virtual terminal connection 20 on the second communication device 201-206. In this case, a check is performed, in particular, in order to determine whether the path costs between the virtual root network node and network nodes of the second subnetwork 2 with virtual terminal connections 20 which have already been activated for the virtual root network node have the value 0. If this does not apply to a network node of the second subnetwork 2, an incorrect configuration is likewise signaled.

As an alternative to the procedure described above, the virtual root network node may also be configured by checking, when a virtual terminal connection 20 intended for the virtual root bridge 100 on a communication device 201-206 is activated, whether all of the communication devices linked to the virtual root bridge 100 are connected to one another inside the same subnetwork. Such a check can be performed, for example, using topology information, for example according to the intermediate system to intermediate system protocol (IS-IS), using neighborhood detection, such as using the link layer discovery protocol (LLDP), or using a matching subnetwork identification, for example according to IEC standard 62439 Net-ID.

At the virtual terminal connections 20 of the communication devices 201-206 associated with the network nodes of the second subnetwork 2, messages containing topology information for the first subnetwork 1, which comprises the virtual root network node, such as bridge protocol data units or messages comprising a respective port priority vector, are configured as received messages. In addition, failure of a communication device 201-206 associated with a network node of the second subnetwork or of a connection between two network nodes of the second subnetwork 2 is handled solely in accordance with the ring redundancy protocol. A configuration of the virtual root network node as the root network node of the first subnetwork 1 is retained in this case.

The communication devices 201-206 associated with the network nodes of the second subnetwork 2 interchange messages containing topology information for the first subnetwork 1 with one another in accordance with the ring redundancy protocol and compare the messages with locally available topology information for the first subnetwork. In the present exemplary embodiment, the messages containing topology information for the first subnetwork 1 that are interchanged between the communication devices 201-206 of the second subnetwork 2 each comprise a port priority vector, from the comparison of which all communication devices 201-206 consistently determine a root priority vector as the resultant topology information for the first subnetwork 1 based on a comparison result. The communication devices 201-206 associated with the network nodes of the second subnetwork 2 use the determined resultant topology information for the first subnetwork 1 to adapt their configuration with respect to closed and/or open connections to the first subnetwork 1. The communication devices 101-110, 201-206 associated with the network nodes of the first subnetwork 1 and of the second subnetwork 2 are switches or bridges in the present exemplary embodiment.

The resultant topology information for the first subnetwork 1, as consistently determined by the communication devices 201-206 of the second subnetwork 2, is also made available to the communication devices 101-110 of the first subnetwork 1 for use of the spanning tree protocol in the first subnetwork 1. The second subnetwork 2 can therefore be treated as a star-shaped expansion starting from the virtual root bridge 100 for use of the spanning tree protocol in the first subnetwork 1. Therefore, the transit connections through the second subnetwork 2 are transparent to the communication devices 101-110 of the first subnetwork 1.

Figure 2:
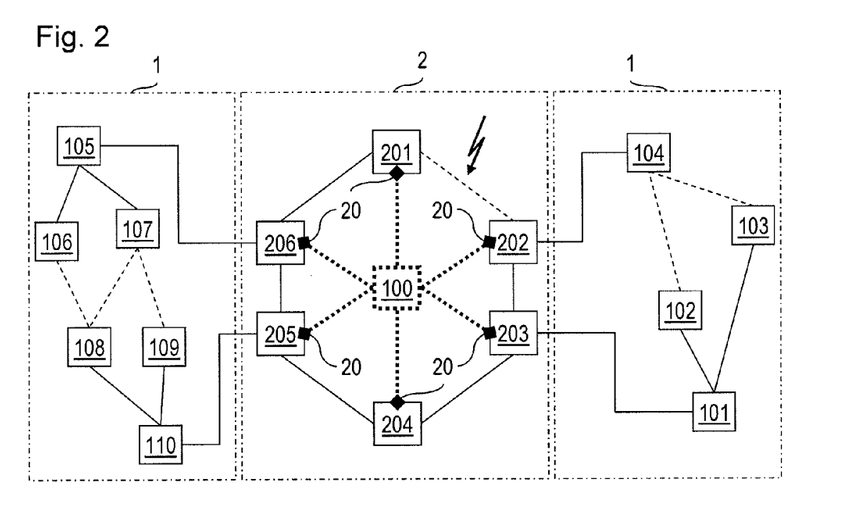
FIG. 2 shows the communication network according to FIG. 1 in a state with a connection error in the second subnetwork.
Figure 3:
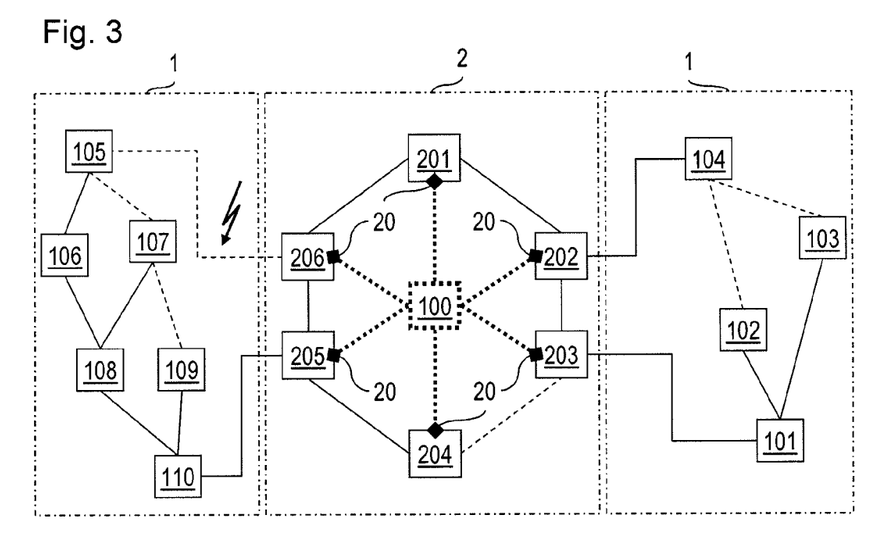
FIG. 3 shows the communication network according to FIG. 1 in a state with a connection error in the first subnetwork.

In an error-free connection state, the connections between the communication devices 102 and 104, 103 and 104, 203 and 204, 106 and 108, 107 and 108 and 107 and 109 are deactivated to avoid loop connections in accordance with FIG. 1. In the event of a connection error in the second subnetwork 2 between the communication devices 201 and 202, as illustrated in FIG. 2, the connection between the communication devices 203 and 204 is activated in accordance with the ring redundancy protocol used in the second subnetwork 2, without this affecting the first subnetwork 1. In a corresponding manner, a connection error between the communication devices 206 and 105, as illustrated in FIG. 3, also does not have any far-reaching consequences for the second subnetwork 2. This is because only the connection between the communication devices 205 and 110 remains activated in accordance with the spanning tree protocol used in the first subnetwork 1 for the purpose of handling errors, without this affecting the remaining communication devices 201-204, 206. Further error-handling measures, i.e., activation of the connections between the communication devices 106 and 108 and 107 and 108 and deactivation of the connection between the communication devices 105 and 107, remain restricted to the first subnetwork 1. Error handling can therefore always be, in principle, in the subnetwork directly affected by an error or a fault based on a communication protocol used there.

Figure 4:
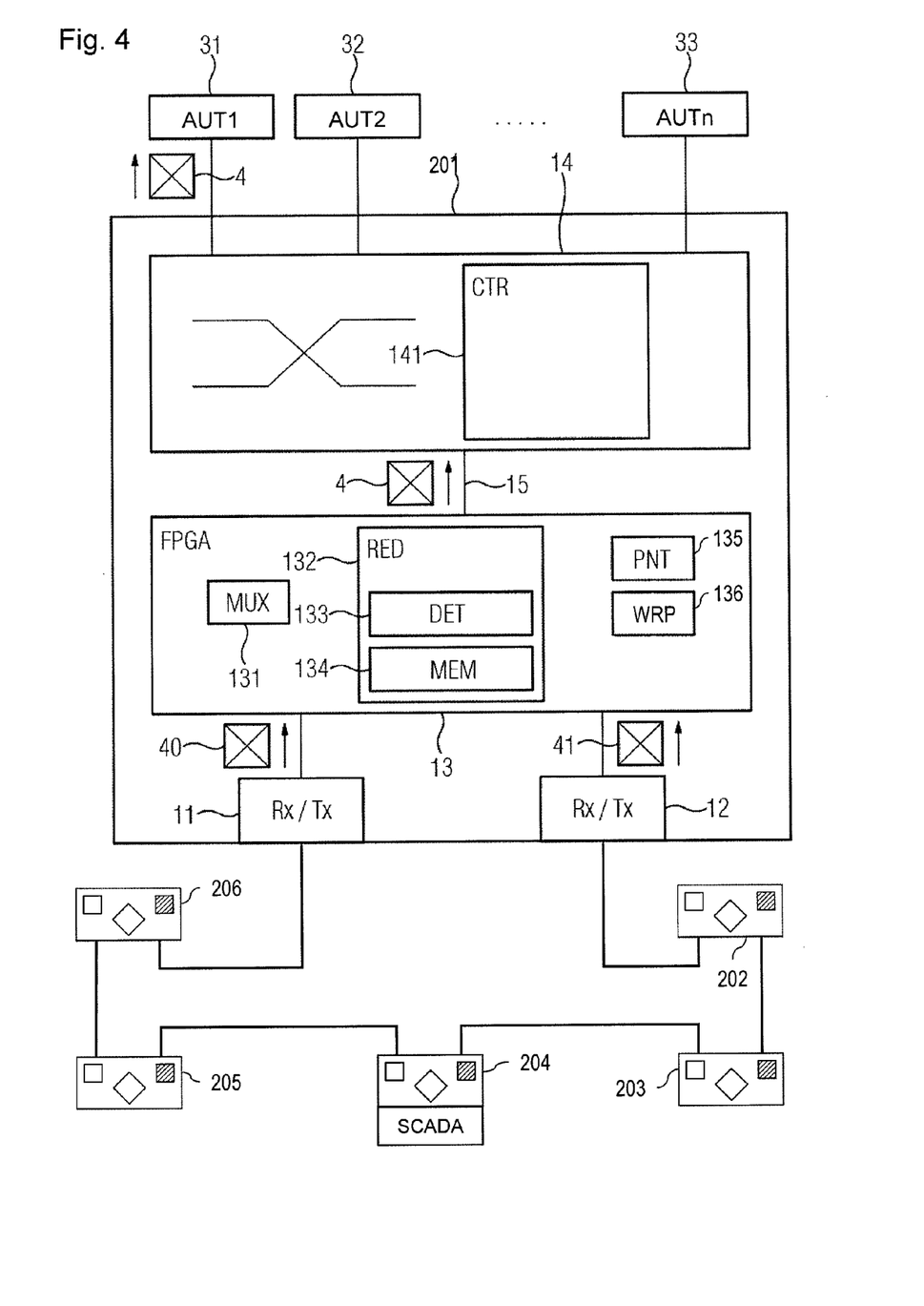
FIG. 4 shows a communication device associated with a network node of the second subnetwork.

FIG. 4 illustrates, in more detail, a communication device 201 that is associated with a network node of the second subnetwork 2 and is connected to further communication devices 202-206 in a ring structure. In principle, the remaining communication devices 202-206 of the second subnetwork 2 may also have an identical structure. A communication device 204 may be associated with a supervisory control and data acquisition (SCADA) system of an industrial production or process automation system, for example.

As a device for transmitting messages inside the second subnetwork, the communication device 201 comprises at least one first transmitting and receiving unit 11 and one second transmitting and receiving unit 12, a signal processing unit 13 with a multiplexer unit 131 and a redundancy handling unit 132 and a coupling element 14 which is connected to the signal processing unit 13. Both transmitting and receiving units 11, 12 may have an identical network address and an identical media access control (MAC) device identifier. When using a PC-based solution with two communication network expansion cards, they may have different MAC addresses. Here, one of the two MAC addresses is consistently used by both expansion cards as a common MAC address for transmitting and receiving operations.

The multiplexer unit 131 is used to forward data packets to be transmitted to both transmitting units 11, 12 in a parallel manner, while the redundancy handling unit 132 is intended to process data packets 40, 41 received by both receiving units 11, 12. In addition, the redundancy handling unit 132 comprises a filter unit 133 which is set up to detect received redundant data packets. In particular, the redundancy handling unit 132 is used as a way to handle failure of a communication device associated with a network node of the second subnetwork or of a connection between two network nodes of the second subnetwork. In the present exemplary embodiment, such failure is handled solely in accordance with the ring redundancy protocol.

In the present exemplary embodiment, the signal processing unit is implemented using a field programmable gate array (FPGA). The coupling element 14 is a backplane switch with an associated controller 141 and connects a plurality of automation devices 31, 32, 33 to the signal processing unit 13. Furthermore, the coupling element 14 is connected to the automation devices 31, 32, 33 via a respective interlink terminal connection. The signal processing unit 13 has a memory unit 135 that stores a table (proxy node table) containing details of all automation devices 31, 32, 33 connected to the coupling element 14.

As a device means for interchanging messages containing topology information for the first subnetwork 1 in accordance with the ring redundancy protocol, the communication device 201 illustrated in FIG. 4 comprises the first transmitting and receiving unit 11 and the second transmitting and receiving unit 12, the signal processing unit 13, the coupling element 14 and a protocol wrapper 136 associated with the signal processing unit. In addition, the signal processing unit 13 is intended to compare interchanged messages containing topology information for the first subnetwork 1 with topology information locally available in the communication device 201. In the present exemplary embodiment, the signal processing unit 13 is also configured and set up to determine resultant topology information for the first subnetwork 1 based on a comparison result.

In addition, the controller 141 of the coupling element 14 is advantageously intended to adapt the configuration of the communication device 201 with respect to closed and/or open connections to the first subnetwork 1. Here, the configuration is adapted using the determined resultant topology information for the first subnetwork 1. The controller 141 of the coupling element 14 is also used to configure the virtual root network node. The controller 141 is additionally intended to configure topology information comprising the virtual root network node as topology information for the first subnetwork 1 which is received at a virtual terminal connection 20.

The communication device 201 is preferably set up to transmit messages both in accordance with the high-availability seamless redundancy protocol and in accordance with the media redundancy protocol. For message transmission in accordance with the high-availability seamless redundancy protocol, the redundancy handling unit 132 comprises a memory unit 134 that is set up to store sequence numbers of messages which have already been received in an error-free manner. Upon receiving a new message, the redundancy handling unit 13 can therefore check its sequence number for a match with a sequence number which has already been stored and can possibly reject redundant messages which are identified by a consistent sequence number and can accordingly be detected.

The features of the exemplary embodiments described above can be implemented both individually and in the described combination with one another. In particular, use of the present invention is not restricted to a second subnetwork in which a ring redundancy protocol is used, but rather the above comments analogously also apply to a second subnetwork in which a parallel redundancy protocol is used.

Figure 5:
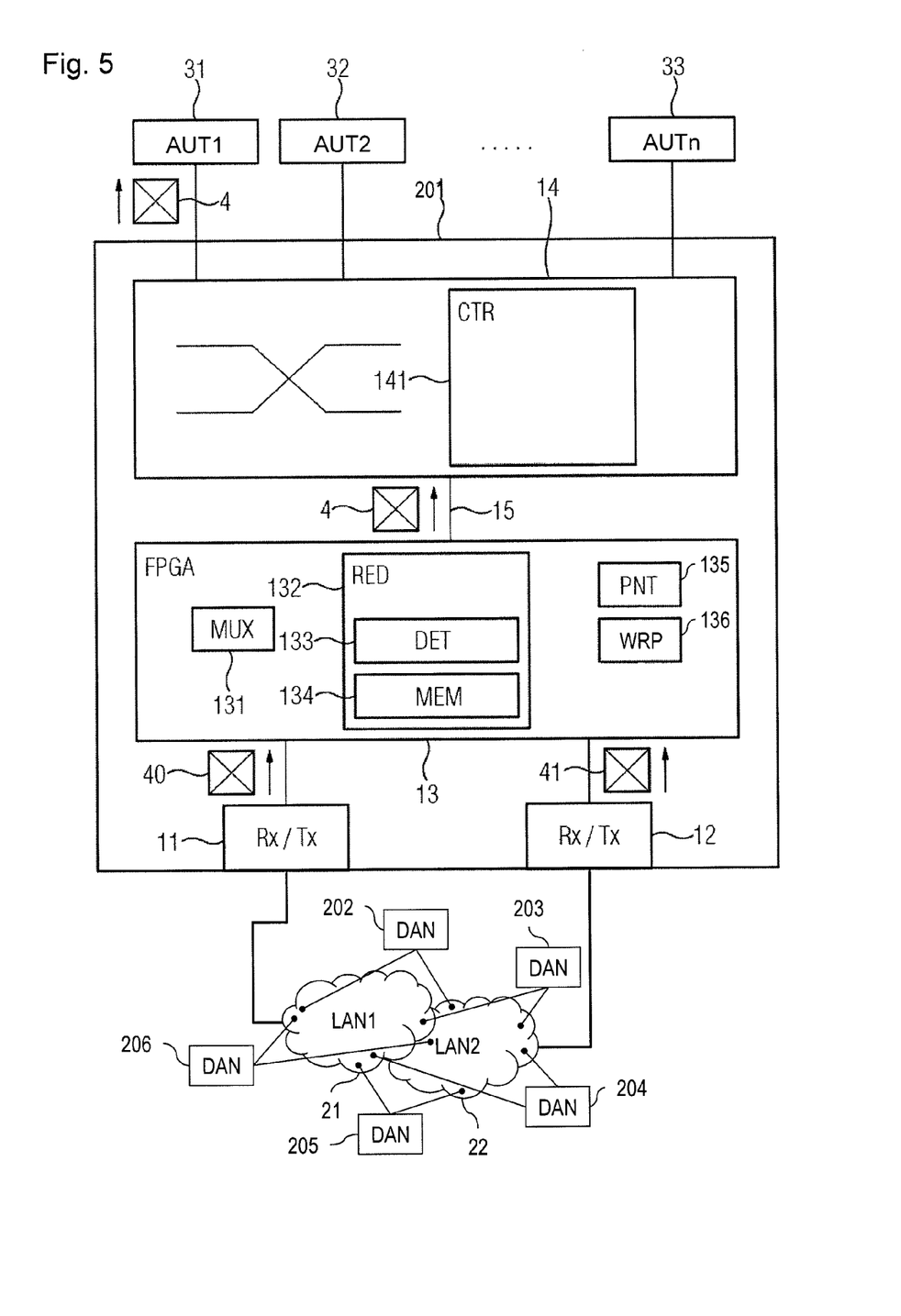
FIG. 5 shows a communication device associated with a network node of a subnetwork in which a parallel redundancy protocol is used.

FIG. 5 illustrates, by way of example, a communication device 201 for a second subnetwork in which the parallel redundancy protocol is used. Here, the second subnetwork 2 comprises, for example, two local area networks 21, 22, which are redundant with respect to one another, and to which a transmitting and receiving unit 11, 12 of the communication device 201 illustrated in FIG. 5 is respectively connected, which communication device, for the rest, comprises corresponding components to those in the communication device 201 illustrated in FIG. 4. These include, in particular, a signal processing unit 13 with a multiplexer unit 131, a redundancy handling unit 132, a memory unit 135 for a proxy node table and a protocol wrapper 135 as well as a coupling element 14 with an associated controller. With regard to their functionality, these components correspond to those of the communication device 201 illustrated in FIG. 4, applied to the parallel redundancy protocol. In addition to the communication device 201, yet further communication devices 202-206 are connected twice to the two local area networks 21, 22 which are redundant with respect to one another. These communication devices 202-206 may be identical to the communication device 201 in terms of structure and functionality.

Figure 6:
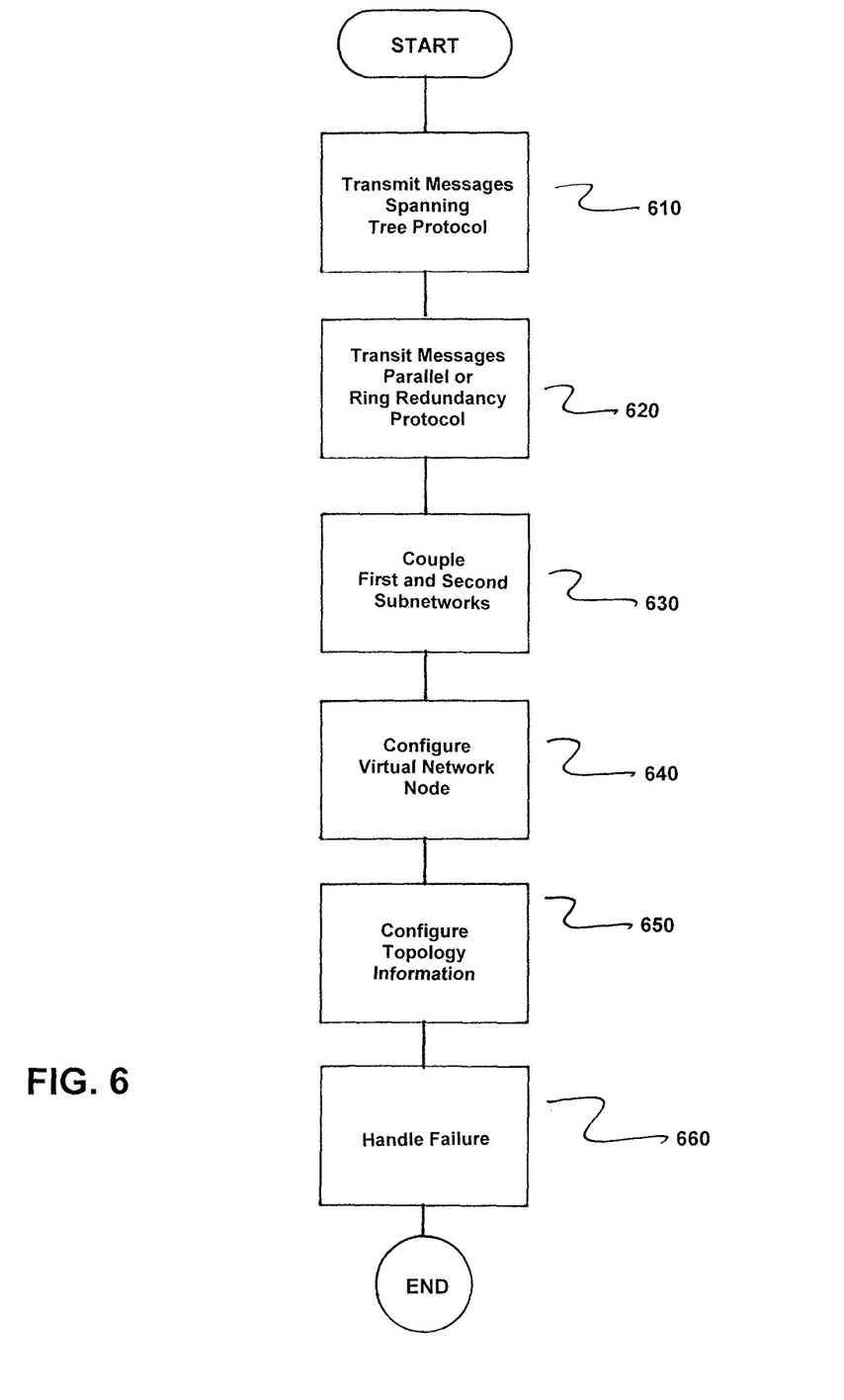
FIG. 6 is a flowchart of the method in accordance with the invention.

FIG. 6 is a flowchart of a method for transmitting messages in a redundantly operable industrial communication network. The method comprises transmitting messages in a first subnetwork having a tree topology in accordance with a spanning tree protocol, as indicated in step 610. Here, communication devices associated with network nodes of the first subnetwork interchange messages containing topology information with one another to form a tree topology, where a root network node is determined as a basic element of the tree topology by the communication devices associated with the network nodes of the first subnetwork based on the interchanged topology information, and loop-free connections are set up from the root network node to remaining network nodes of the first subnetwork.

Next, messages in a second subnetwork are transmitted in accordance with a parallel or ring redundancy protocol, as indicated in step 620. The first and second subnetworks are now coupled to one another via a plurality of communication devices, as indicated in step 630. Next, a virtual network node, which is connected to all network nodes of the second subnetwork via a respective virtual connection which cannot be interrupted by an error, is configured as a root network node of the first subnetwork, as indicated in step 640.

Topology information for the first subnetwork, which comprises the virtual network node, is configured as received topology information for the first subnetwork at a respective virtual terminal connection of communication devices associated with the network nodes of the second subnetwork, as indicated in step 650. Failure of a communication device associated with one of (i) a network node of the second subnetwork and (ii) a connection between two network nodes of the second subnetwork is now handled solely in accordance with one of a parallel or ring redundancy protocol, as indicate in step 660. In accordance with the invention, a configuration of the virtual network node is thus retained as the root network node of the first subnetwork.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for transmitting messages in a redundantly operable industrial communication network, comprising:
    transmitting messages in a first subnetwork having a tree topology in accordance with a spanning tree protocol, communication devices associated with network nodes of the first subnetwork interchanging messages containing topology information with one another to form a tree topology, a root network node being determined as a basic element of the tree topology by the communication devices associated with the network nodes of the first subnetwork based on the interchanged topology information, and loop-free connections being set up from the root network node to remaining network nodes of the first subnetwork;
    transmitting messages in a second subnetwork in accordance with a parallel or ring redundancy protocol;
    coupling the first and second subnetworks to one another via a plurality of communication devices;
    configuring a virtual network node, which is connected to all network nodes of the second subnetwork via a respective virtual connection which cannot be interrupted by an error, as a root network node of the first subnetwork;
    configuring topology information for the first subnetwork, which comprises the virtual network node, as received topology information for the first subnetwork at a respective virtual terminal connection of communication devices associated with the network nodes of the second subnetwork; and
    handling failure of a communication device associated with one of (i) a network node of the second subnetwork and (ii) a connection between two network nodes of the second subnetwork solely in accordance with one of a parallel or ring redundancy protocol, a configuration of the virtual network node as the root network node of the first subnetwork being retained.

2. The method as claimed in claim 1, further comprising:
    activating a respective virtual terminal connection on at least two communication devices associated with network nodes of the second subnetwork to configure the virtual network node.

3. The method as claimed in claim 2, wherein, when configuring the virtual network node, topology information for the first subnetwork is initially checked, in each case using a node identifier associated with a root network node, in order to determine whether a virtual network node identified by its node identifier is already present inside the first subnetwork; and
    wherein a virtual terminal connection on a first communication device associated with a first network node of the second subnetwork is activated only in a case of a negative check result, disappearing path costs being associated with a virtual connection between the first network node and the virtual network node.

4. The method as claimed in claim 3, wherein in a case of a positive check result, path costs between a first network node of the second subnetwork, which is associated with the first communication device, and the virtual network node are determined; and
    wherein a virtual terminal connection on a second communication device associated with a second network node of the second subnetwork is activated only in a case of disappearing path costs between the first network node and the virtual network node, disappearing path costs being associated with a virtual connection between the second network node and the virtual network node.

5. The method as claimed in claim 4, wherein an incorrect configuration is signaled in a case of non-disappearing path costs between the first network node and the virtual network node.

6. The method as claimed in claim 1, wherein, when configuring the virtual network node, a check is performed to determine whether all communication devices linked to the virtual network node are connected to one another inside the second subnetwork, and wherein an incorrect configuration is signaled in cases of a negative check result.

7. The method as claimed in claim 2, wherein, when configuring the virtual network node, a check is performed to determine whether all communication devices linked to the virtual network node are connected to one another inside the second subnetwork, and wherein an incorrect configuration is signaled in cases of a negative check result.

8. The method as claimed in claim 1, wherein the communication devices associated with the network nodes of the second subnetwork interchange messages containing topology information for the first subnetwork with one another in accordance with the parallel or ring redundancy protocol, compare said messages with locally available topology information for the first subnetwork and determine resultant topology information for the first subnetwork based on a comparison result.

9. The method as claimed in claim 8, wherein the communication devices associated with the network nodes of the second subnetwork use the determined resultant topology information for the first subnetwork to adapt their configuration with respect to at least one of closed and open connections to the first subnetwork.

10. The method as claimed in claim 1, wherein the topology information for the first subnetwork comprises details of existing connections between network nodes of the first subnetwork, and wherein loop-free connections from the root network node to remaining network nodes of the first subnetwork are set up using a determination of minimum path costs to the root network node.

11. The method as claimed in claim 1, wherein messages are transmitted between communication devices associated with the network nodes of the second subnetwork only in accordance with the parallel or ring redundancy protocol.

12. The method as claimed in claim 1, wherein resultant topology information for the first subnetwork is consistently determined by all communication devices associated with the network nodes of the second subnetwork.

13. The method as claimed in claim 12, wherein the communication devices associated with the network nodes of the second subnetwork provide consistent resultant topology information for use of the spanning tree protocol in the first subnetwork.

14. The method as claimed in claim 1, wherein the spanning tree protocol is one of rapid spanning tree protocol and multiple spanning tree protocol.

15. The method as claimed in claim 13, wherein the messages containing topology information for the first subnetwork are bridge protocol data units.

16. The method as claimed in claim 14, wherein the messages containing topology information for the first subnetwork each comprise a port priority vector which is interchanged and compared among communication devices associated with the network nodes of the second subnetwork.

17. The method as claimed in claim 15, wherein the messages containing topology information for the first subnetwork each comprise a port priority vector which is interchanged and compared among communication devices associated with the network nodes of the second subnetwork.

18. The method as claimed in claim 1, wherein the communication devices associated with the network nodes of at least one of the first subnetwork and second subnetwork are one of switches and bridges.

19. The method as claimed in claim 1, wherein the parallel or ring redundancy protocol is one of parallel redundancy protocol, high-availability seamless redundancy protocol and media redundancy protocol.

20. A communication device for a redundantly operatable industrial communication network, comprising:
a first subnetwork having a tree topology and message transmission in accordance with a spanning tree protocol;
a second subnetwork having message transmission in accordance with a parallel or ring redundancy protocol;
a plurality of communication devices operable coupling the e both the first and second subnetworks together;
means for transmitting messages inside the second subnetwork in accordance with a parallel or ring redundancy protocol;
means for configuring a root network node of the first subnetwork as a virtual network node which is connected to all network nodes of the second subnetwork via a respective virtual connection which cannot be is uninterruptable by an error;
means for configuring topology information for the first subnetwork, which comprises the virtual network node, as topology information for the first subnetwork received at a virtual terminal connection, the topology information being for determining a root network node as a basic element of the tree topology, and the root network node forming a starting point for setting up loop-free connections to remaining network nodes of the first subnetwork;
means for handling failure of a communication device associated with a network node of one of (i) the second subnetwork or (ii) a connection between two network nodes of the second subnetwork solely in accordance with the parallel or ring redundancy protocol, a configuration of the virtual network node as the root network node of the first subnetwork being retained.

21. The communication device as claimed in claim 20, wherein the virtual network node is configured by activating a virtual terminal connection on at least two communication devices associated with network nodes of the second subnetwork.

22. The communication device as claimed in claim 21, wherein the communication device is configured such that, when configuring the virtual network node, topology information for the first subnetwork is initially checked, in each case using a node identifier associated with a root network node, in order to determine whether a virtual network node identified by its node identifier is already present inside the first subnetwork, and is further configured such that a virtual terminal connection on a first communication device associated with a first network node of the second subnetwork is activated only in a case of a negative check result, disappearing path costs being associated with a virtual connection between the first network node and the virtual network node.

23. The communication device as claimed in claim 22, wherein the communication device is configured such that, in a case of a positive check result, path costs between a first network node of the second subnetwork, which is associated with the first communication device, and the virtual network node are determined, and is further configured such that a virtual terminal connection on a second communication device associated with a second network node of the second subnetwork is activated only in a case of disappearing path costs between the first network node and the virtual network node, disappearing path costs being associated with a virtual connection between the second network node and the virtual network node.

24. The communication device as claimed in claim 23, wherein the communication device is configured such that an incorrect configuration is signaled in a case of non-disappearing path costs between the first network node and the virtual network node.

25. The communication device as in claim 20, wherein the communication device is set up and configured in such a manner that, when configuring the virtual network node, a check is performed to determine whether all communication devices linked to the virtual network node are connected to one another inside the second subnetwork, and is further configured such that an incorrect configuration is signaled in a case of a negative check result.

26. The communication device as claimed in claim 20, further comprising:
means for interchanging messages containing topology information for the first subnetwork with further communication devices associated with network nodes of the second subnetwork in accordance with the parallel or ring redundancy protocol.

27. The communication device as claimed in claim 26, further comprising:
means for comparing interchanged messages containing topology information for the first subnetwork with locally available topology information for the first subnetwork and for determining resultant topology information for the first subnetwork based on a comparison result.

28. The communication device as claimed in claim 27, further comprising:
means for adapting a configuration of the communication device with respect to one of closed and open connections to the first subnetwork using the determined resultant topology information for the first subnetwork.

* * * * *